United States Patent
Tegtmeier et al.

(10) Patent No.: US 9,567,178 B2
(45) Date of Patent: Feb. 14, 2017

(54) DEVICE AND METHOD FOR PRODUCING PACKAGES OF STACKED MATERIALS

(71) Applicant: Maschinenbau Oppenweiler Binder GmbH & Co. KG, Oppenweiler (DE)

(72) Inventors: Bodo Tegtmeier, Aldorf (DE); Jochen Krawtschuk, Murrhardt (DE); Olaf Haug, Berglen (DE)

(73) Assignee: MASCHINENBAU OPPENWEILER BINDER GMBH & CO. KG, Oppenweiler (DE)

( * ) Notice: Subject to any disclaimer, the term of this patent is extended or adjusted under 35 U.S.C. 154(b) by 0 days.

(21) Appl. No.: 14/932,387

(22) Filed: Nov. 4, 2015

(65) Prior Publication Data

US 2016/0145050 A1    May 26, 2016

(30) Foreign Application Priority Data

Nov. 25, 2014 (EP) .................................. 14 194 756

(51) Int. Cl.
| | |
|---|---|
| *B65H 29/14* | (2006.01) |
| *B65H 31/30* | (2006.01) |
| *B65G 47/04* | (2006.01) |
| *G05B 15/02* | (2006.01) |
| *B65H 31/06* | (2006.01) |
| *B65H 33/02* | (2006.01) |

(52) U.S. Cl.
CPC .............. *B65H 29/14* (2013.01); *B65G 47/04* (2013.01); *B65H 31/06* (2013.01); *B65H 31/309* (2013.01); *B65H 33/02* (2013.01); *G05B 15/02* (2013.01); *B65H 2301/42146* (2013.01); *B65H 2301/445* (2013.01); *B65H 2404/64* (2013.01); *B65H 2701/1932* (2013.01)

(58) Field of Classification Search
CPC ........ B65H 31/06; B65H 29/14; B65H 31/309
See application file for complete search history.

(56) References Cited

U.S. PATENT DOCUMENTS

| | | | |
|---|---|---|---|
| 1,603,294 A | 10/1926 | Reiser | |
| 2,841,394 A * | 7/1958 | Stobb | B65H 29/14 271/185 |
| 3,822,793 A * | 7/1974 | Stobb | B65H 29/14 271/177 |

(Continued)

FOREIGN PATENT DOCUMENTS

| | | |
|---|---|---|
| DE | 69712364 T4 | 1/2003 |
| DE | 60004631 T2 | 6/2004 |

*Primary Examiner* — Thomas Randazzo
(74) *Attorney, Agent, or Firm* — Lucas & Mercanti, LLP

(57) ABSTRACT

The device for producing packages of stacked materials consisting of a plurality of individual signatures comprises a first conveying unit, which defines a signature path. The first conveying unit moves the signatures along the signature path into a vertical position. The device also comprises a stacking table with a support surface for supporting the signatures, which are arriving with a vertical orientation. The stacking table comprises a second conveying unit, which moves the stacked signatures in a conveying direction of the stack. A control unit switches a tilting device between an active state, in which the tilting device tilts or compresses an upper area of the stacked signatures, and an inactive state, in which the tilting device exerts no effect on the stacked signatures.

13 Claims, 3 Drawing Sheets

(56) References Cited

U.S. PATENT DOCUMENTS

| | | | | |
|---|---|---|---|---|
| 4,463,940 A | * | 8/1984 | Mock | B65H 29/14 |
| | | | | 270/52.14 |
| 4,844,438 A | * | 7/1989 | Mistyurik | B65C 9/10 |
| | | | | 271/181 |
| 4,941,650 A | * | 7/1990 | Raybuck | B65H 29/669 |
| | | | | 198/418.8 |
| 5,092,236 A | * | 3/1992 | Prim | B65H 29/46 |
| | | | | 100/220 |
| 5,273,516 A | * | 12/1993 | Crowley | B62B 1/08 |
| | | | | 414/789.2 |
| 5,366,212 A | * | 11/1994 | Crowley | B65H 7/00 |
| | | | | 198/418.8 |
| 5,380,148 A | * | 1/1995 | Bates | B65H 29/12 |
| | | | | 198/835 |
| 5,692,999 A | * | 12/1997 | Crowley | B62B 1/10 |
| | | | | 108/1 |
| 5,782,469 A | * | 7/1998 | Schoon | B65H 29/14 |
| | | | | 271/177 |
| 8,919,767 B2 | * | 12/2014 | Boos | B65H 31/06 |
| | | | | 270/58.11 |
| 2003/0234485 A1 | | 12/2003 | Gosslinghoff | |
| 2009/0290961 A1 | * | 11/2009 | Langston | B65B 5/04 |
| | | | | 414/222.01 |

\* cited by examiner

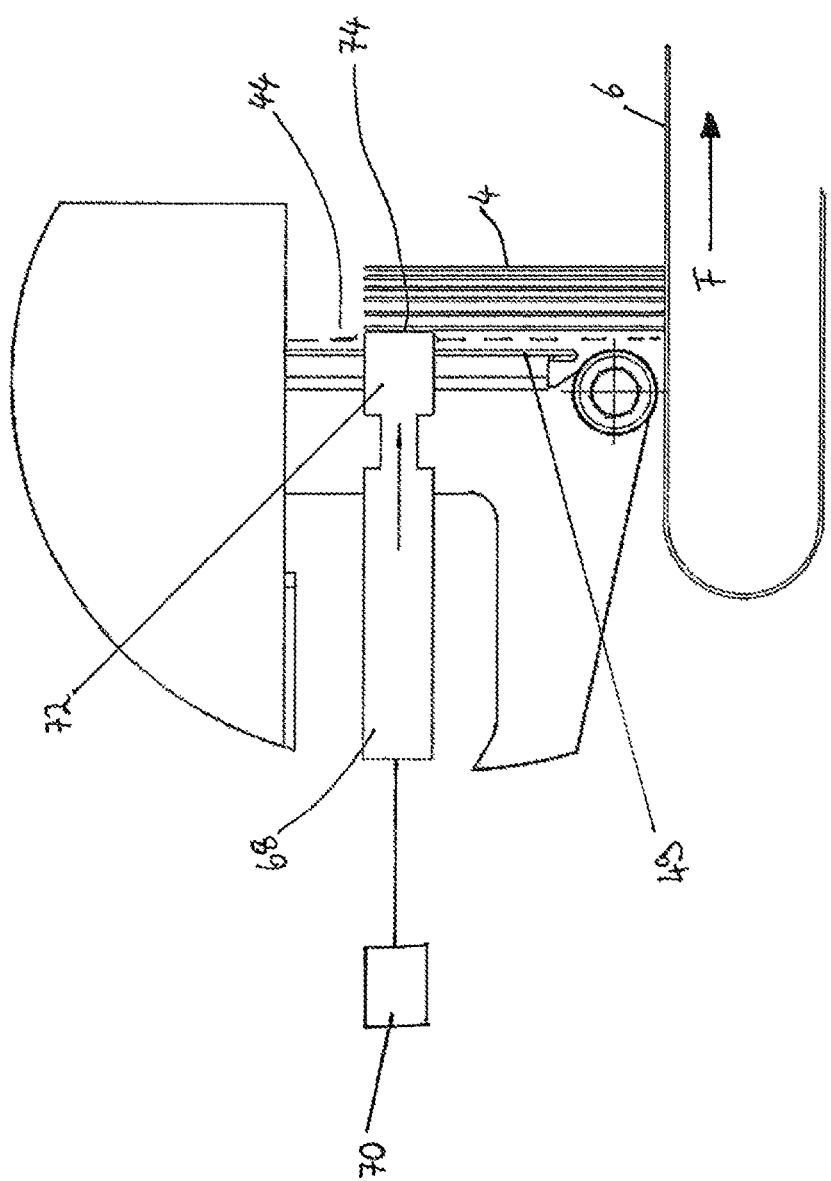

DEVICE AND METHOD FOR PRODUCING PACKAGES OF STACKED MATERIALS

CROSS-REFERENCE TO RELATED APPLICATIONS

The present application claims priority of EP 14 194 756.4, filed Nov. 25, 2014, the priority of this application is hereby claimed and this application is incorporated herein by reference.

BACKGROUND OF THE INVENTION

The present invention relates to a device and to a method for producing packages of stacked materials, especially in the form of blocks comprising a plurality of individual signatures.

A device for stacking signatures is described in, for example, DE 697 12 364 T4. The signatures are first moved by a conveying unit along a substantially arc-shaped signature path from a horizontal position to a vertical position and stacked on a stacking table. Above the stacking table, the signature path comprises a vertical end section, so that the signatures are stacked with a substantially vertical orientation on the stacking table. By arranging signatures next to each other in a row, so-called "blocks" are formed, which are strapped to compress them and then packaged.

A similar device which stacks signatures to form a block is disclosed in DE 600 04 631 T2.

These devices usually operate with a conveying device which transports the stream of signatures in fish-scale fashion, that is, with an edge area of one signature resting on an edge area of the adjacent signature, to the stacking table. The problem here is that, when freshly printed signatures are fish-scaled for transport, printing ink can be transferred from one signature to another.

For this reason, it would be preferable in these areas of application to feed the sheets separately, i.e., to transport the signatures singly, one by one. In the area where the signatures are stacked, however, problems can be expected when the incoming signatures impinge on the signatures already stacked, because each newly arriving signature no longer receives the guidance achieved by the fish-scaling, which is no longer operative.

SUMMARY OF THE INVENTION

It is an object of the present invention to provide a device for producing packages of stacked materials, by means of which trouble-free stacking of separately transported signatures is made possible without the incoming signatures arriving during the stacking process impinging on the signatures already stacked on the stacking table.

According to an aspect of the invention, the device for producing packages of stacked materials, especially in the form of blocks consisting of a plurality of individual signatures, comprises a first conveying unit. The first conveying unit defines a signature path, wherein the first conveying unit moves the signatures along the signature path into a vertical position. The device also comprises a stacking table, which comprises a support surface for supporting the vertically oriented signatures being transported to it. The stacking table comprises a second conveying unit, which moves the signatures, now stacked to form a block, in the conveying direction of the stack. The device also comprises a tilting device to tilt or to compress an upper area of the stacked signatures. The tilting device is arranged above the support surface and is at a predetermined vertical distance from the support surface. A control unit switches the tilting device between an active state, in which the tilting device tilts or compresses the upper area of the stacked signatures, and an inactive state, in which the tilting device exerts no influence on the stacked signatures.

With this configuration, the tilting device achieves the benefit that the signatures are tilted in the conveying direction of the stack in such a way that the following signatures intended to join up with the signatures already deposited in the stack can be set down on the support surface of the stacking table without impinging on or being at angle to those already on the table.

So that signatures of different sizes can be stacked, the tilting device is preferably height-adjustable.

It is especially advantageous for the predetermined vertical distance between the tilting device and the at least one support surface to be in the range of 6-30 cm. As a result of the predetermined vertical distance of the tilting device, the signatures are tilted at an optimal point in the upper area of the signatures, so that it is impossible for the incoming signatures to impinge on the signatures already present in the stack.

The signature path preferably has the effect of deflecting the signatures around an angle of substantially 270°. As a result of this deflection by 270°, the signatures are moved from a horizontal position into a vertical position, in which they are then stacked.

The device preferably also comprises a sensor, which is arranged in the area of the signature path upstream from the tilting device, and which is adapted to detect the passage of each signature and to transmit a corresponding sensor signal to the control unit. The sensor can be used as a trigger, controlling the tilting device in such a way that, when the distances between the separately transported signatures vary, it ensures that the tilting device will be switched between the active and the inactive state at the optimum times.

It is especially advantageous for the control unit to be adapted to switch the tilting device into the inactive state and then back again into the active state on the basis of the sensor signal, the speed of the first conveying unit, and the distance between the sensor and the tilting device.

The signature path preferably comprises a vertical end section above the support surface, and the sensor is arranged upstream from the vertical end section near the vertical end section. This guarantees that the distance between the sensor and the tilting device is kept as small as possible, which has the effect of avoiding control inaccuracies.

It is especially advantageous for the tilting device to comprise at least one pushrod. The at least one pushrod is a mechanically simple way of realizing the tilting device.

So that the signatures are not damaged when they are tilted, the at least one pushrod preferably has a profile free of sharp projections.

It is advantageous for the at least one pushrod, when in the active state, to be extended in the conveying direction of the stack beyond the vertical end section of the signature path, whereas, when in the inactive state, it is retracted behind the vertical end section of the signature path and thus does not contact the signatures.

The tilting device tilts the signatures advantageously in a tilting direction corresponding to the conveying direction of the stack.

According to another aspect of the invention, the method for producing packages of stacked materials, especially in the form of blocks consisting of a plurality of individual signatures, comprises the following steps:

conveying separated signatures along a signature path by means of a first conveying unit, wherein the signatures are brought into a vertical position;

setting the signatures, arriving with a vertical orientation, down onto the support surface of the stacking table to form a stack of signatures; and conveying the stacked signatures onward in the conveying direction of the stack by means of a second conveying unit;

wherein, during the stack-forming step, a tilting device is switched between an active state, in which the tilting device tilts or compresses an upper area of the stacked signatures, and an inactive state, in which the tilting device exerts no effect on the signatures.

With this method, it is guaranteed that the separately arriving signatures do not impinge on other signatures already present in the stack on the support surface of the stacking table, which means that the trouble-free operation of the device can be ensured.

It is especially advantageous for a sensor for detecting the passage of a signature and for transmitting a corresponding sensor signal to the control unit to be arranged in the area of the signature path upstream from the tilting device. On the basis of the sensor signal, the speed of the first conveying unit, and the distance between the sensor and the tilting device, the control unit switches the tilting device into the inactive state and then back into the active state. As a result, the tilting device is deactivated as soon as a new signature is to be set down onto the stacking table. The tilting device is deactivated abruptly, so that it cannot interfere with the newly arriving signature as it proceeds on its way. At the same time, the deactivation time must be selected so that the stack has not yet returned completely from its tilted position before the new signature arrives. Advantage is therefore taken of the mass moment of inertia of the signature stack.

The tilting device preferably comprises at least one pushrod, which, when switched to the active state, extends in the conveying direction of the stack beyond the vertical end section of the signature path, whereas, in the inactive state, it is retracted behind the vertical end section of the signature path and thus does not contact the signatures.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

Additional features and advantages of the present invention can be derived from the following description, which refers to the drawings:

FIG. 3 shows another enlarged diagram of a preferred embodiment of the tilting device.

DETAILED DESCRIPTION OF THE INVENTION

Figure 1:
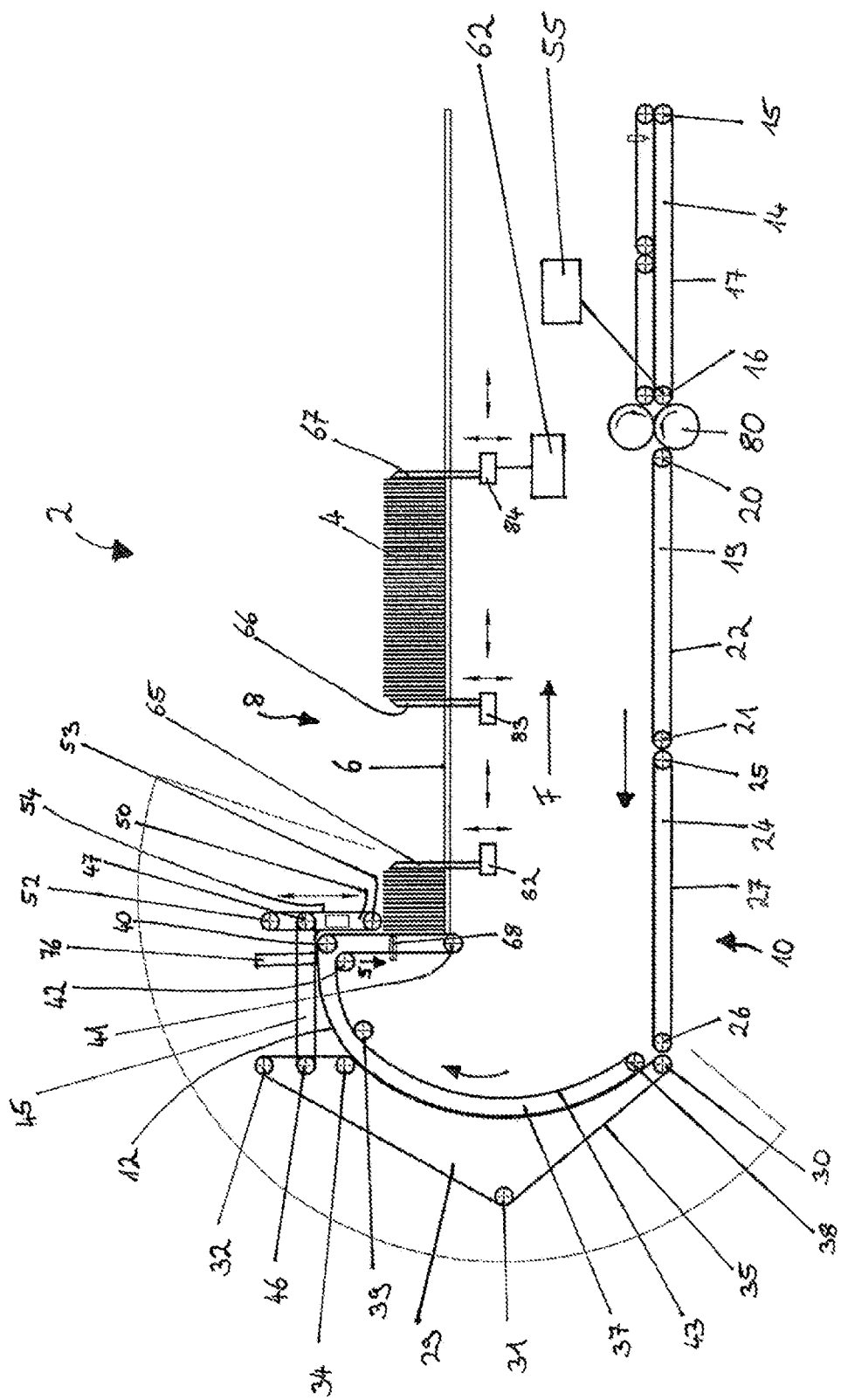
FIG. 1 shows a schematic cross-sectional diagram of one embodiment of the device according to the invention for producing packages of stacked materials in the form of blocks consisting of a plurality of individual signatures.
Figure 2:
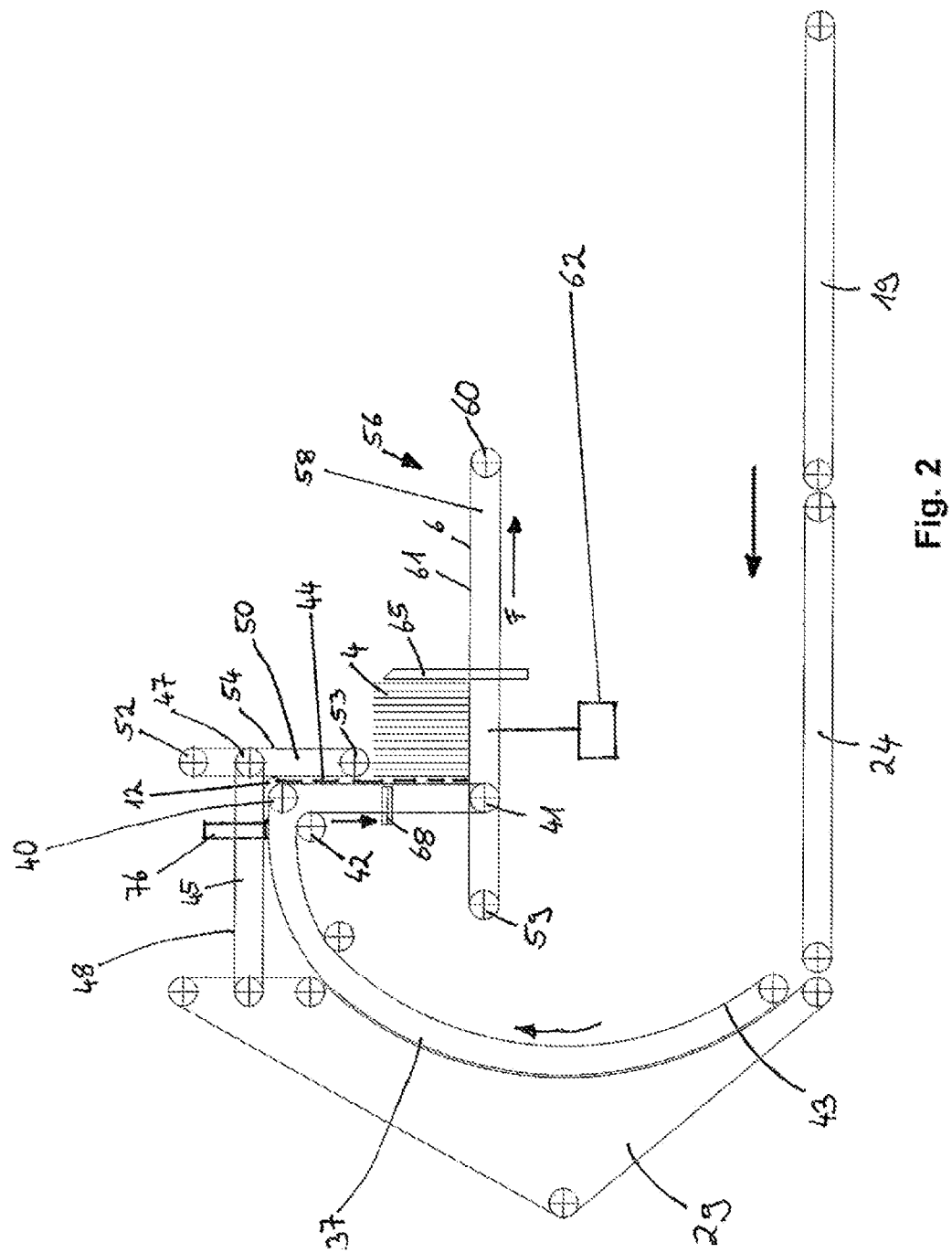
FIG. 2 shows an enlarged cross-sectional view, similar to that of FIG. 1, of the relevant parts of an embodiment of the device.

FIGS. 1 and 2 show the basic schematic structure of one embodiment of the device 2 according to the invention. The device 2 serves to move separately transported signatures 4 along a signature path 12 from a horizontal position into a vertical position and to set the signatures 4 on edge onto the support surface 6 of a stacking table 8. "Signatures" 4 are understood to be, for example, sheets and booklets as well as printed products such as brochures, book blocks, magazines, and newspapers. The term "stacking" is understood to be the arranging of individual signatures 4 in a row, wherein a row consisting of several stacked signatures 4 forms a so-called "block".

The device 2 comprises a first conveying unit 10. The conveying unit 10 serves to move the separated signatures 4 along the signature path 12 from a horizontal position into a vertical position. Details of the configuration of the conveying unit 10 can vary within the scope of the invention.

In FIG. 1, the first conveying unit 10 comprises several transport systems 14, 19, 24, 29, 37, 45, 50, arranged in a row. Beginning at the bottom right, there are three transport systems 14, 19, 24 arranged next to each other horizontally in a row. Each of the transport systems 14, 19, 24 comprises a pair of pulleys 15, 16; 20, 21; 25, 26, at least some of which are driven, and a belt 17, 22, 27. The belts 17, 22, 27 pass around their associated pulleys 15, 16; 20, 21; 25, 26. The transport systems 14, 19, 24 can also comprise means for producing a negative pressure, which thus draws the signatures 4 toward the belts as the signatures are traveling forward. Alternatively, it is possible, in a manner similar to that of the transport system 14, to provide additional, opposing belts for each of the transport systems 14, 19, 24, namely, belts which rotate in the direction opposite to that of the belts 17, 22, 27. The signatures 4 are then guided in sandwich fashion. It is also possible for the signatures to be guided by means of only one belt, i.e., a lower belt.

Additional components such as pressing rolls 80 or pass-through sensors can also be arranged along the signature path 12.

Then the conveying unit 10 deflects the signatures 4 by 270° from a horizontal position to a vertical position. There are several configurations known for this purpose. In the example shown here, this deflection is achieved by means of the cooperation among the transport systems 29, 37, 45, and 50.

The transport system 29 comprises pulleys 30, 31, 32, 34 and a belt 35. The transport system 37 also comprises pulleys 38, 39, 40, 41, 42 and a belt 43. The transport systems 29, 37 are driven in opposite directions and convey the signatures 4 in sandwich fashion. In the area where the belt 35 is directly adjacent to the belt 43, both belts travel around a curve, which preferably comprises the form of an arc of a circle.

Following the circular arc section, the signature 4 is conveyed further along a curved path by the belt 43, wherein another transport system 45 with pulleys 46 and 47 and a horizontal traveling belt 48 (see FIG. 2) provide a supportive function. In this area the signatures are guided between the belts 48 and 43.

The two pulleys 40, 42 then form the transition to a vertical end section 44 of the signature path 12, which is drawn in broken line in FIGS. 2 and 3. For this purpose, the belt 43 is deflected around the pulleys 40, 42 and then extends to the pulley 41. The pulley 41 is arranged in the area of the support surface 6 of the stacking table 8, preferably just behind it. The signature path 12 thus is deflected in this area by substantially 90° from the horizontal to the vertical.

In the upper area of the vertical end section 44, a belt 54 of an additional, vertically traveling transport system 50 is arranged, parallel to the belt 43. The transport system 50 comprises pulleys 52, 53, around which the belt 54 travels. In the upper area of the vertical end section 44, the signatures 4 are thus guided in sandwich fashion between the belts 43 and 54. The transport system 50 ends a certain distance above a support surface 6 of the stacking table 8, so that the stacked signatures 4 can be moved horizontally underneath. The transport system 50 is height-adjustable and can thus be adapted to individual signatures 4 of different lengths. The conveying direction S of the conveying unit 10 in the area of the vertical end section 44 extends vertically downward in corresponding fashion.

The drives of the conveying unit 10 are actuated by a common controller 55. The conveying unit 10 can have only one drive, or it can have several drives.

In the lower area of the vertical end section 44 of the signature path 12, permanently installed guide strips 49 (see FIG. 3) can also take over the guidance function to a point just above the support surface 6 of the stacking table 8. The support surface 6 of the stacking table 8 extends horizontally away from the vertical end section 44 in the conveying direction F of the stack. The signatures, arriving with a vertical orientation, are set down onto the support surface 6, i.e., deposited there and formed into a stack.

The support surface 6 is usually configured as a plate, along which the signatures 4 can be pushed (see FIG. 1). The support surface 6 of the stacking table 8 can also, however, be an element which is itself movable in the conveying direction F, and which, for example, is part of an additional transport system 58 (see FIG. 2). In FIG. 2, the transport system 58 comprises two pulleys 59, 60 and an endless conveyor belt 61.

In each case, the stacking table 8 comprises a second conveying unit 56, which moves in a conveying direction F of the stack, which is in the form of a block of stacked signatures 4. Various possibilities known to the person skilled in the art exist for this purpose. In the embodiment shown in FIG. 1, the second conveying unit 56 (see FIG. 2) comprises three vertical retaining elements 65, 66, 67, which serve to support the sides of the stacked signatures 4. The retaining elements 65, 66, 67, when in use, extend from below the support surface 6 to a point above the support surface 6 of the stacking table 8. Recesses in the support surface 6 are preferably provided to allow the retaining elements 65, 66, 67 to pass through. Ideally, the retaining elements 65, 66, 67 are extended when in use in such a way that they can support the entire length of the signatures 4.

During the stack-forming process, one of the retaining elements 65, 66, 67 is required to form the boundary of the stack in the upstream position relative to the conveying direction F. As soon as the stack is complete, another retaining element 65, 66, 67 is required for the boundary of the stack in the downstream position relative to the conveying direction F. The finished stack is then pushed in the conveying direction F, as can be seen in the upper-middle part of FIG. 1. While the finished stack is being pushed, the third retaining element 65, 66, 67 is now already forming the upstream boundary, relative to the conveying direction F, of the next stack.

Each retaining element 65, 66, 67 is movable independently of the others and is also connected to a slide 82, 83, 84. The slides 82, 83, 84 are movable back and forth in the conveying direction F.

When a retaining element 65, 66, 67 is to be moved back into the starting position, it must be pulled down under the support surface 6 of the stacking table 8, so that the corresponding slide 82, 83, 84 can move without interference.

In the case of FIG. 2, the transport system 58 also belongs to the second conveying unit 56.

All of the movements of the second conveying unit 56 are preferably controlled by a single controller 62. The controller 62 and the controller 55 can be configured as a single unit.

According to an aspect of the invention, the device 2 also comprises a tilting device 68, which serves to tilt or to compress an upper area of the stacked signatures 4. The tilting device 68 is described in greater detail with reference to FIG. 3.

The tilting device 68 is arranged above the support surface 6 of the stacking table 8 in the area of the vertical end section 44 of the signature path 12. The tilting device 68 is at a predetermined vertical distance from the support surface 6 of the stacking table 8. So that the tilting device 68 can always act on the upper area of the stacked signatures 4, the tilting device 68 is height-adjustable. It is advantageous for the predetermined vertical distance between the tilting device 68 and the support surface 6 to be in the range of 6-30 cm.

The device 2 also comprises a control unit 70, which switches the tilting device 68 between an active state and an inactive state. The control unit 70 can be configured together with one of the controllers 55, 62 or both controllers 55, 62 as a single unit.

In the active state, the tilting device 68 tilts the signatures 4 in the conveying direction F, whereas, in the inactive state, the tilting device 68 has no effect on the signatures 4.

In the preferred embodiment shown in FIG. 3, the tilting device 68 comprises at least one pushrod 72. The at least one pushrod 72 is movable back and forth in a horizontal direction. The device preferably comprises several pushrods 72, which are arranged at the same height but with a lateral offset from each other. It must be possible for the at least one pushrod 72 to be moved in the conveying direction F past the guide strips 49 and/or the belt 43. So that the individual signatures 4 are not damaged during the tilting process, the at least one pushrod 72 comprises a pushing surface 74 free of sharp projections. The pushing surface 74 is preferably configured as a smooth, vertically oriented surface.

In the active state, the at least one pushrod 72 is extended in the conveying direction F of the stack beyond the vertical end section 44 of the signature path 12 and contacts the signatures 4, tilting them in the conveying direction F. In the inactive state, the pushrod 72 is retracted behind the vertical end section 44 of the signature path 12 and thus does not contact the signatures 4. The view presented in FIG. 3 shows a state in which the at least one pushrod 72 has been extended to a point just before the pushing surface 74 of the at least one pushrod 72 touches the signatures 4. As the at least one pushrod 72 continues to move toward the right, the upper area of the stacked signatures 4 is compressed or tilted toward the right. In the inactive state, the at least one pushrod 72 is pulled back to a position farther to the left than that shown in FIG. 3.

To guarantee that the incoming signatures 4 can be set down onto the support surface 6 of the stacking table 8 as additional elements of an already existing stack without impinging on the signatures 4 already in the stack, the tilting device 68 must be switched between the active and the inactive state with optimal timing. When a new signature 4 is to be set down on the stacking table, the tilting device 68 must be deactivated at precisely the right time. The tilting device 68 is deactivated so that it does not obstruct the new signature 4 on its way to the stack, but also so that the upper area of the stack has not completely returned from its compressed or tilted position before the new signature 4 arrives. Advantage is taken here of the mass moment of inertia of the signature stack. The rear side of the stack, which is still somewhat curved, therefore forms a kind of guide aid for the newly arriving signature 4.

In cases where all of the signatures are being transported at exactly the same speed by the first conveying unit 10 and at uniform distances from each other, the activation and deactivation of the tilting device 68 can, under certain conditions, be implemented according to a predefined pattern.

It is preferable, however, to provide a sensor 76 in the area of the signature path 12, which detects the passage of a signature 4 and sends a corresponding sensor signal to the control unit 70. The sensor can thus be used as a trigger, serving as the basis for the actuation of the tilting device 68, so that no problems will occur even when the distances between the separately transported signatures 4 vary.

The sensor 76 can be configured as a light barrier, such as an infrared light barrier. The sensor 76 is advantageously arranged upstream from the tilting device 68 and the vertical end section 44 of the signature path 12 and close to the vertical end section 44. Ideally, the sensor 76 is arranged in the area of the pulley 40, so that it can detect the passage of the signatures 4 shortly before the transition to the vertical end section 44. Other positions of the sensor 76 are also possible, however.

The control unit 70 requires not only the sensor signals but additional information as well, usually the speed of the first conveying unit 10 and the distance between the sensor 76 and the tilting device 68.

When a signature 4 passes through the area of the sensor 76, the control unit 70 switches the tilting device 68 into the inactive state after an appropriate time delay and then, after the new signature 4 has arrived in the area of the stack, it switches the tilting device back into the active state.

The sequence of steps in the production of the package of stacked materials is described in greater detail below.

The signatures 4 are transported one after the other, preferably at a predetermined distance from each other, along the signature path 12. As a rule, the signatures 4 are conveyed by the first conveying unit 10 with their main folds facing forward, so that the main fold will ultimately rest on the support surface 6 of the stacking table 8 as the stack is being formed. Before the signature 4 enters the vertical end section 44, the signature 4 passes by the sensor 76. The sensor 76 detects the passage of the signature 4 and transmits the corresponding sensor signal to the control unit 70.

The control unit 70, which has received the signal from the sensor 76, switches the tilting device 68 out of the active state, in which the signatures 4 are tilted by the tilting device 68, into the inactive state, in which the tilting device 68 has no effect on the signatures 4, on the basis of the received signal and possibly other process parameters. The signature 4 which is just arriving is set down onto the support surface 6 of the stacking table 8 with its main fold pointing down. Then the tilting device 68 is switched out of its inactive state and back into the active state and is ready for the next signature 4.

Once a certain number of signatures 4 have been set down onto the support surface 6 of the stacking table 8, the signatures 4 are conveyed onward as a stack by the second conveying unit 56. Then support boards (not shown) are placed on the right and left sides of the stack, and finally the stack of signatures, held between the support boards, is sent to a packaging station (not shown), preferably a strapping station. While this one stack of signatures is still being conveyed onward, the incoming signatures 4 can already be forming a new stack. Thus it is guaranteed that the stacking process does not have to be interrupted each time a stack has been completed.

In the present description, mention has been made of "horizontal" and "vertical" orientations for certain elements of the present invention. The invention is also applicable to configurations in which certain deviations from these orientations are present.

Depending on the embodiment, the deflection angle of the signature path 12 can also be more or less than 270°. In particular, it is also possible for a deflection of only 90° to occur.

In addition to the signal from the sensor 76, the distance between the sensor 76 and the tilting device 68, and the speed at which the signatures 4 are entering the vertical end section 44, the control unit 70 can also make use of additional process parameters to actuate the tilting device 68.

In the present description, the tilting device 68 consisted of at least one pushrod 72, but it can also comprise other components acting mechanically or pneumatically on the stack.

While specific embodiments of the invention have been shown and described in detail to illustrate the inventive principles, it will be understood that the invention may be embodied otherwise without departing from such principles.

We claim:

1. A device for producing packages of stacked materials in the form of blocks comprising a plurality of individual signatures, the device comprising:
   a first conveying unit, which defines a signature path, wherein the first conveying unit is adapted to move separated signatures along the signature path into a substantially vertical position;
   a stacking table having a support surface for supporting the signatures arriving with a substantially vertical orientation, wherein the stacking table comprises a second conveying unit, which serves to move a stack of signatures, stacked in the form of a block, in a conveying direction of the stack,
   a tilting device for tilting or compressing an upper area of the stacked signatures, wherein the tilting device is arranged above the support surface and is at a predetermined vertical distance from the support surface, wherein the tilting device comprises at least one pushrod; and
   a control unit, which serves to switch the tilting device between an active state, in which the tilting device tilts or compresses the upper area of the stacked signatures, and an inactive state, in which the tilting device exerts no effect on the stacked signatures.

2. The device according to claim 1, wherein the predetermined vertical distance between the tilting device and the support surface is in the range of 6-30 cm.

3. The device according to claim 1, wherein the at least one pushrod has a profile free of sharp projections.

4. The device according to claim 1, wherein, when the tilting device is in the active state, the at least one pushrod is extended in the conveying direction of the stack beyond the vertical end section of the signature path, whereas, when the tilting device is in the inactive state, the at least one pushrod is retracted behind the vertical end section of the signature path and thus does not contact the signatures.

5. The device according to claim 1, wherein the tilting device tilts the signatures in a tilting direction which corresponds to the conveying direction of the stack.

6. The device according to claim 1, wherein the tilting device is height-adjustable.

7. The device according to claim 6, wherein the signature path brings about a deflection of the signatures by substantially 270°.

8. The device according to claim 1, wherein the device comprises a sensor, which is arranged in an area of the signature path upstream from the tilting device and which is adapted to detect a passage of each signature and to send a corresponding sensor signal to the control unit.

9. The device according to claim 8, wherein the control unit is adapted to switch the tilting device into the inactive state and then back into the active state again on the basis of the sensor signal, a speed of the first conveying unit, and a distance between the sensor and the tilting device.

10. The device according to claim 8, wherein the signature path comprises a vertical end section above the support surface, and the sensor is arranged upstream from the vertical end section and near the vertical end section.

11. A method for producing packages of stacked materials in the form of blocks comprising a plurality of individual signatures, the method comprising the following steps:
   conveying separated signatures along a signature path by means of a first conveying unit and bringing the signatures into a vertical position;
   setting the signatures, arriving with a vertical orientation, down onto a support surface of a stacking table to form a stack of signatures; and
   conveying the stack of signatures onward by means of a second conveying unit in a conveying direction of the stack;
   wherein, during the step of forming the stack of signatures, a tilting device is switched between an active state, in which the tilting device tilts or compresses an upper area of the stacked signatures, and an inactive state, in which the tilting device exerts no effect on the stacked signatures, and
   wherein the tilting device comprises at least one pushrod, which, when the tilting device is in the active state, is extended in the conveying direction of the stack beyond a vertical end section f the signature path, whereas, when the tilting device is in the inactive state, the at least one pushrod is retracted behind the vertical end section of the signature path and thus does not contact the staged signatures.

12. The method according to claim 11, wherein a sensor for detecting the passage of a signature and for sending a corresponding sensor signal to a control unit is arranged in an area of the signature path upstream from the tilting device, wherein the control unit switches the tilting device into the inactive state and then back into the active state on the basis of the sensor signal, a speed of the first conveying unit, and a distance between the sensor and the tilting device.

13. The method according to claim 11, wherein the tilting device tilts the signatures in a tilting direction which corresponds to the conveying direction of the stack.

* * * * *

UNITED STATES PATENT AND TRADEMARK OFFICE
CERTIFICATE OF CORRECTION

PATENT NO. : 9,567,178 B2  
APPLICATION NO. : 14/932387  
DATED : February 14, 2017  
INVENTOR(S) : Bodo Tegtmeier et al.

Page 1 of 1

It is certified that error appears in the above-identified patent and that said Letters Patent is hereby corrected as shown below:

On the Title Page

Please delete Item (72) Inventors: Lines 1-3 and insert:
--(72) Inventors: Bodo TEGTMEIER Alfdorf, (DE); Jochen KRAWTSCHUK Murrhardt, (DE); Olaf HAUG Berglen, (DE)--

Signed and Sealed this  
Second Day of May, 2017

Michelle K. Lee  
*Director of the United States Patent and Trademark Office*